United States Patent
Mountain

(10) Patent No.: US 9,723,249 B2
(45) Date of Patent: Aug. 1, 2017

(54) ARCHIVING BROADCAST PROGRAMS

(75) Inventor: Dale Llewelyn Mountain, West Yorkshire (GB)

(73) Assignee: ECHOSTAR HOLDINGS LIMITED, Steeton (GB)

(*) Notice: Subject to any disclaimer, the term of this patent is extended or adjusted under 35 U.S.C. 154(b) by 1099 days.

(21) Appl. No.: 12/407,208

(22) Filed: Mar. 19, 2009

(65) Prior Publication Data
US 2010/0239226 A1 Sep. 23, 2010

(51) Int. Cl.
*H04N 5/44* (2011.01)
*H04N 5/78* (2006.01)
(Continued)

(52) U.S. Cl.
CPC .......... *H04N 5/76* (2013.01); *G11B 20/10527* (2013.01); *G11B 27/034* (2013.01);
(Continued)

(58) Field of Classification Search
CPC ..... G06F 11/1458; G06F 17/00; H04N 7/167; H04N 5/4403; H04N 5/44582; H04N 21/235; H04N 21/4334; H04N 21/44582; H04N 21/4622; H04N 21/4722; H04N 5/44543; H04N 5/781; H04N 9/8042;
(Continued)

(56) References Cited

U.S. PATENT DOCUMENTS 5,765,164 A 6/1998 Prasad
5,826,168 A 10/1998 Inoue et al.
(Continued)

FOREIGN PATENT DOCUMENTS

AU 2010328446 A1 6/2012
CA 2783157 A1 6/2011
(Continued)

OTHER PUBLICATIONS

U.S. Appl. No. 12/632,942, filed Dec. 8, 2009 in the name of Martch, etc.
(Continued)

*Primary Examiner* — Thai Tran
*Assistant Examiner* — Syed Hasan
(74) *Attorney, Agent, or Firm* — Kilpatrick Townsend & Stockton LLP

(57) ABSTRACT

A system for receiving and presenting broadcast programming has a television receiver connected to a set-top box having an internal hard disc on which selected programs may be recorded. As the internal hard disc has a finite capacity it can become full, particularly if the viewer wishes to retain a library of recordings. The system provides for the automatic transfer of programs stored on the internal hard disc to external hard drives. The viewer is enabled to set the criteria for such archiving using the remote control unit and on-screen menu options. Content with the largest size, the earliest recorded content, or the content viewed less frequently, may be automatically archived. The set-top box is also enabled to collate information identifying the externally stored content and to store that on the internal hard drive together with information as to the location of the stored content. This enables a viewer to retrieve the transferred content.

19 Claims, 7 Drawing Sheets

(51) Int. Cl.
*H04N 9/64* (2006.01)
*H04N 9/80* (2006.01)
*G06F 3/00* (2006.01)
*G06F 19/00* (2011.01)
*H04N 5/76* (2006.01)
*G11B 20/10* (2006.01)
*G11B 27/034* (2006.01)
*G11B 27/30* (2006.01)
*G11B 27/10* (2006.01)
*H04N 5/445* (2011.01)
*H04N 5/765* (2006.01)
*H04N 5/775* (2006.01)
*H04N 5/781* (2006.01)

(52) U.S. Cl.
CPC ....... *G11B 27/3027* (2013.01); *H04N 5/4403* (2013.01); *G11B 27/105* (2013.01); *H04N 5/44582* (2013.01); *H04N 5/765* (2013.01); *H04N 5/775* (2013.01); *H04N 5/781* (2013.01)

(58) Field of Classification Search
CPC ...... H04H 60/13; H04H 60/27; G11B 27/105; G11B 27/134
USPC ...... 386/83, 248, 289, 314, 323, 343, E5.07, 386/261, 291, 355; 725/38, 37, 39, 86, 725/105, 114, 116, 118, 46, 61, 89, 134, 725/135, 136, 141, 142; 348/E7.061, 348/731, 734; 714/13, E11.12; 700/94
See application file for complete search history.

(56) References Cited

U.S. PATENT DOCUMENTS

| | | | |
|---|---|---|---|
| 6,701,528 B1 | 3/2004 | Arsenault et al. | |
| 6,931,657 B1* | 8/2005 | Marsh | H04N 5/4401 348/E5.105 |
| 7,110,006 B2 | 9/2006 | MacInnis et al. | |
| 7,191,215 B2 | 3/2007 | Ganesan | |
| 7,568,129 B2 | 7/2009 | Sugihara | |
| 7,581,238 B1 | 8/2009 | Taylor et al. | |
| 7,627,888 B2 | 12/2009 | Ganesan | |
| 8,024,757 B2 | 9/2011 | Nara et al. | |
| 8,315,502 B2 | 11/2012 | Martch et al. | |
| 8,873,927 B2 | 10/2014 | Martch | |
| 2001/0019630 A1 | 9/2001 | Johnson | |
| 2002/0126986 A1* | 9/2002 | Lim | G11B 27/031 386/291 |
| 2002/0154892 A1 | 10/2002 | Hoshen et al. | |
| 2003/0026254 A1 | 2/2003 | Sim | |
| 2003/0093792 A1* | 5/2003 | Labeeb et al. | 725/46 |
| 2003/0194201 A1* | 10/2003 | Cho | 386/46 |
| 2003/0221198 A1* | 11/2003 | Sloo | G06F 17/30796 725/136 |
| 2004/0143672 A1 | 7/2004 | Padmanabham et al. | |
| 2005/0102704 A1* | 5/2005 | Prokupets et al. | 725/118 |
| 2005/0120373 A1 | 6/2005 | Thomas et al. | |
| 2005/0193414 A1* | 9/2005 | Horvitz | H04N 21/482 725/46 |
| 2005/0256596 A1* | 11/2005 | Kataoka | G11B 27/034 700/94 |
| 2006/0037037 A1 | 2/2006 | Miranz | |
| 2006/0075293 A1* | 4/2006 | Bodlaender | 714/13 |
| 2006/0085817 A1 | 4/2006 | Kim | |
| 2006/0110127 A1* | 5/2006 | Iggulden | 386/52 |
| 2006/0206609 A1 | 9/2006 | Ganesan et al. | |
| 2006/0206889 A1 | 9/2006 | Ganesan | |
| 2006/0218217 A1 | 9/2006 | Ganesan et al. | |
| 2006/0218218 A1 | 9/2006 | Ganesan et al. | |
| 2006/0218220 A1 | 9/2006 | Ganesan et al. | |
| 2006/0248078 A1 | 11/2006 | Gross et al. | |
| 2007/0038687 A1 | 2/2007 | Carroll et al. | |
| 2007/0056002 A1 | 3/2007 | Ganesan et al. | |
| 2007/0133953 A1 | 6/2007 | Fontijn et al. | |
| 2007/0143790 A1* | 6/2007 | Williams | H04N 5/44543 725/38 |
| 2007/0212025 A1* | 9/2007 | Barton | G11B 27/105 386/261 |
| 2007/0255913 A1 | 11/2007 | Weaver | |
| 2008/0022304 A1* | 1/2008 | Prus et al. | 725/39 |
| 2008/0022343 A1 | 1/2008 | Hodzic et al. | |
| 2008/0216120 A1 | 9/2008 | Knudson et al. | |
| 2008/0243769 A1 | 10/2008 | Arbour et al. | |
| 2008/0281913 A1 | 11/2008 | Shankar et al. | |
| 2008/0282036 A1 | 11/2008 | Ganesan | |
| 2009/0010610 A1* | 1/2009 | Scholl et al. | 386/68 |
| 2009/0024762 A1 | 1/2009 | Ganesan | |
| 2009/0024846 A1 | 1/2009 | Ganesan et al. | |
| 2009/0025046 A1 | 1/2009 | Ganesan et al. | |
| 2009/0031424 A1 | 1/2009 | Ganesan et al. | |
| 2009/0106407 A1 | 4/2009 | Kodama et al. | |
| 2009/0177712 A1 | 7/2009 | Shimizu | |
| 2010/0121908 A1* | 5/2010 | Nulkar | H04L 41/044 709/203 |
| 2010/0239226 A1 | 9/2010 | Mountain | |
| 2010/0262997 A1 | 10/2010 | Dove | |
| 2011/0135284 A1 | 6/2011 | Martch | |

FOREIGN PATENT DOCUMENTS

| | | |
|---|---|---|
| CN | 102687507 A | 9/2012 |
| EP | 1431979 A1 | 6/2004 |
| EP | 1615133 A2 | 1/2006 |
| EP | 2510685 A1 | 10/2012 |
| IL | 220157 A | 4/2015 |
| JP | 2001169235 A | 6/2001 |
| JP | 2007282043 A | 10/2007 |
| JP | 2013-513339 A | 4/2013 |
| KR | 10-1468786 | 12/2014 |
| TW | I451760 | 11/2011 |
| WO | 2005/029852 A1 | 3/2005 |
| WO | 2009/009106 A1 | 1/2009 |
| WO | 2009018428 A2 | 2/2009 |

OTHER PUBLICATIONS

Australian Government, Patent Examination Report No. 1, dated Jul. 29, 2013 for Australian Patent Application No. 2010328446, 4 pages.
International Search Report and Written Opinion for PCT/US2010/059013 mailed Mar. 31, 2011, 13 pages.
International Preliminary Report on Patentability for PCT/US2010/059013 issued Jun. 12, 2012, 9 pages.
U.S. Appl. No. 12/632,942, filed Dec. 8, 2009, Non-Final Rejection mailed Mar. 2, 2012, all pages.
U.S. Appl. No. 12/632,942, filed Dec. 8, 2009, Notice of Allowance mailed Jul. 23, 2012, all pages.
U.S. Appl. No. 13/610,725, filed Sep. 11, 2012, Non-Final Rejection mailed Jul. 3, 2013, all pages.
U.S. Appl. No. 13/610,725, filed Sep. 11, 2012, Final Rejection mailed Jan. 22, 2014, all pages.
U.S. Appl. No. 13/610,725, filed Sep. 11, 2012, Notice of Allowance mailed Jun. 11, 2014, all pages.

* cited by examiner

| DATE RECORDED | CHANNEL | PROGRAM |
|---|---|---|
| TUES 19 FEB 08 | MOVIES 1 | MEET ME IN SAINT LOUIS |
| WED 5 MAR 08 | HISTORY | DISAPPEARING BRITAIN |
| FRI 27 JUN 08 | SKY TRAVEL | TOP 10 PLACES TO SWIM WI... |
| FRI 22 AUG 08 | SKY ONE HD | LOST |
| FRI 29 AUG 08 | SKY MOVIES HD | THE LONGEST YARD |

☐ MOVIES  ☐ SPORTING EVENT  ☐ DRAMA SERIES  ☐ SOAPS

PRESS (SELECT) TO VIEW

FIG.4

ARCHIVING BROADCAST PROGRAMS

The present invention relates to a method of archiving broadcast programs, to a method of presenting broadcast programs which have been archived, and to a system for receiving and presenting broadcast programs.

BACKGROUND TO THE INVENTION

Receivers for broadcast programming, such as television receivers, are generally provided with a digital device, such as a set-top box, to generate and present an electronic program guide to facilitate viewer selection. It is becoming common to provide an internal hard disc in such a set-top box so that received broadcast programs can be recorded for repeat viewing, or for viewing at a later time.

Viewers may develop a library of recorded content, and thus there is a risk that the capacity of the internal hard disc may not be sufficient.

The existence of a capacity issue has been recognized and users have suggested, for example, that a set-top box should be provided with a USB connection to facilitate the transfer of the content stored on a set-top box to a computer. In this way, a user with appropriate computing knowledge, for example, ought to be able to find content on the hard disc in the set-top box and to transfer it for storage on a computer or on memory controlled by a computer.

SUMMARY

The present invention seeks to provide an alternative solution to problems caused by the finite capacity of the internal hard disc of a receiver.

According to a first aspect of the present invention there is provided a method of archiving broadcast programs which have been recorded locally as they are received, the method comprising:

where predetermined criteria for archiving have been met, automatically transferring one or more locally recorded, broadcast programs to external storage storing the transferred programs at selected locations of the external storage, and collating and storing information identifying the transferred broadcast programs and their locations in external storage.

Embodiments of a method of the invention provide for automatic archiving of locally recorded broadcast programs, for example, those recorded on the internal hard drive of a set-top box. With embodiments of the method of the invention, a viewer can organize or agree to the archiving by use of a remote control unit, or of another user interface. All the viewer has to do is to connect appropriate external storage, such as one or more external hard disc drives to the set-top box and then set criteria for archiving using on-screen instructions.

It would be possible to provide, as a criteria for archiving, that everything to be recorded on to the internal hard drive of the set-top box is to be transferred to external storage. However, preferably, embodiments of the invention are used to prevent the internal hard drive from becoming too full, and/or for the convenience of the user. Thus, it may be more convenient to keep content on the internal hard drive if it is frequently accessed.

In an embodiment of the present invention, the criteria for archiving includes one or more of the available storage capacity locally, the age of the recorded programs, the size of the recorded programs, the frequency with which the recorded programs are accessed, and user settings.

An embodiment of a method of the present invention not only automatically archives content, but produces a catalogue or other listing of what has been sent to external storage. The information identifying the transferred broadcast programs is collated and stored with information giving the locations of the content in external storage.

In a preferred embodiment, the information identifying the broadcast programs is stored locally, the method further comprising causing the identifying information to be displayed locally.

The information identifying the broadcast programs may include one or more of:

the date a program was first broadcast,
the date a program was first recorded,
the date a program was transferred to external storage,
the title of the program,
the category of the program,
the identification of the channel on which the program was broadcast,
the program's rating.

The listed or catalogued information about the stored programs is preferably utilized to enable access to the transferred programs. The set-top box may be arranged to cause a listing of the information to be displayed at the receiver so that the user can highlight and select an externally stored broadcast program for presentation.

The present invention also extends to a method of presenting recorded broadcast programs which have been stored externally of a receiver under the control of the receiver, the method comprising displaying at the receiver information identifying externally stored broadcast programs, enabling a user to select an externally stored broadcast program for presentation, locating the selected broadcast program in external storage using location information stored by the receiver, and causing the located broadcast program to be presented by the receiver.

In embodiments of methods of presentation of the invention, the information identifying externally stored programs may be displayed at the receiver in a manner akin to the normal electronic program guide used to provide information about available programs. A user may highlight and select a chosen program, for example, by use of a user interface such as a remote control unit. These actions cause selection of an externally stored program for presentation in a manner similar to the usual selection of broadcast programming for presentation.

In an embodiment, the located externally stored broadcast program is streamed to the receiver for presentation.

Alternatively, the located externally stored broadcast program may be transferred, for example downloaded, to storage local to the receiver and then subsequently presented by the receiver from the local storage.

Copying of the externally stored broadcast program to local storage, such as to the internal hard disc of the set-top box, can be used to make a program immediately available for viewing at a subsequent time. In some instances the external storage may be such as not to provide recordings which are directly playable. In such cases, downloading of the stored content is necessary for access.

In a preferred embodiment, to enable a user to select an externally stored broadcast program for presentation, a list of available externally stored broadcast programs is displayed at the receiver, and a user is enabled to select, by a user interface, one stored program from the list. The information identifying the broadcast programs may include one or more of:

the date a program was first broadcast,
the date a program was first recorded,
the date a program was transferred to external storage,
the title of the program,
the category of the program,
the identification of the channel on which the program was broadcast,
the program's rating.

According to a further aspect of the present invention there is provided a system for receiving and presenting broadcast programs, the system comprising a receiver arranged to receive and process broadcast programs and to cause a selected processed broadcast program to be presented by a presentation device at the receiver, and storage local to the receiver arranged to record and store selected received broadcast programs, the system further comprising additional storage external to, and communicable with, the receiver, wherein the receiver is arranged, when predetermined criteria for archiving have been met, to automatically transfer one or more locally recorded, broadcast programs to the external storage, and to collate and store information identifying the transferred broadcast programs and their locations in the external storage.

A receiver of a system of the invention is able, as required, to tune to selected broadcast programs and to process those programs for presentation. For example, the processing may incorporate demultiplexing, decompression and decoding.

The storage local to the receiver may be controlled to record selected programs. The program recorded may be the same as a program currently selected for presentation or the system may record a program which is not selected for presentation.

The system is arranged to perform the transfer of recorded programs to external storage automatically when predetermined criteria have been set. Whilst it is possible to arrange for all locally recorded programming to be archived, it is generally preferred that the archiving be performed to provide a viewer with efficient access to recordings. This means that if very little is recorded by a viewer it can be retained locally. However, material which is infrequently accessed may be archived by transferring it to external storage, and archiving may be arranged to be carried out once a large proportion, say 75%, of the capacity of the local storage has been used.

In an embodiment, a system of the invention further comprises a user interface for enabling a user to select a broadcast program for presentation, wherein to select for presentation an externally stored broadcast program, one program in said displayed list is selected by way of the user interface.

The user interface provided to access the externally stored broadcast programming is preferably the same user interface provided to enable a user to select a broadcast program for presentation or for recording.

Preferably, the user interface is a remote control unit.

In a preferred embodiment, the presentation device at the receiver comprises a display and at least one loudspeaker, and the receiver comprises a tuner, a processor, and at least one hard disc providing local storage, and the external storage comprises one or more hard discs connectible to the receiver.

It will be appreciated that the elements of the system for receiving and presenting broadcast programs may be packaged as required. Thus, a television receiver incorporating a tuner, a display and one or more loudspeakers may be used together with a set-top box including a processor and at least one hard disc providing local storage. The external storage may comprise one or more hard disc drives connected to the set-top box. However, the components of the system may be distributed between conventional or specialized components as is required.

It will be well understood that what is known as a set-top box is a digital device which may be built in or integrated into a television receiver or may be provided as, or within, a separate device. The present invention comprehends all digital devices for giving a TV receiver functionality whether they are provided separately, in combination with other control circuits and devices and/or whether they are integrated within the television receiver.

BRIEF DESCRIPTION OF THE DRAWINGS

Preferred embodiments of the present invention will hereinafter be described, by way of example, with reference to the accompanying drawings in which:

FIG. 4 shows an on-screen display enabling a user to retrieve selected archived material.

DESCRIPTION OF PREFERRED EMBODIMENTS

This invention arose from the realization that the internal hard disc of a set-top box, to be used in conjunction with a television receiver, has a finite capacity. The invention is described further below specifically with reference to a system having both a television receiver and a set-top box. However, the invention is also applicable to the receiving and storing of programming received by electronic devices other than set-top boxes for television receivers. For example, the invention is applicable to the storage of programming received by an audio player, a computer, or other electronic device.

Throughout the specification we refer to a set-top box for a television receiver. However, it will be understood that the set-top box comprehends any digital device able to impart functionality to the television receiver whether provided in a stand alone box, incorporated in a stand alone box along with other devices, or integrated within the television receiver.

Similarly, the references to broadcast programming comprehend transmissions broadcast terrestrially, by satellite and/or by cable. Programming broadcast by way of the internet and in other ways is also included.

Conveniently, the set-top box is controlled by a user interface in the form of a remote control unit communicating with the set-top box by wireless means. It will be appreciated that any appropriate transmission method to enable the remote control device to communicate with the set-top box may be employed. For example, whilst the remote control device is usually remote from the set-top box, the remote control device may alternatively be wired to the device it commands.

The user interface preferably comprises the conventional remote control unit. However, it will also be possible to arrange for the user interface, whether wirelessly operated or not, to be provided by a keyboard or other device.

Figure 1:
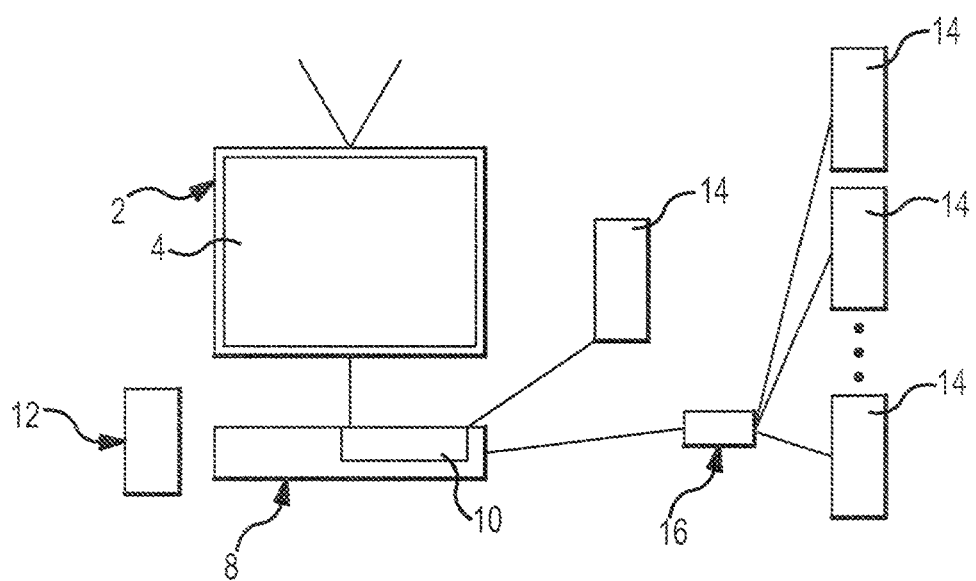
FIG. 1 illustrates a system for receiving and presenting broadcast programs together with external storage for use by the system.

FIG. 1 shows a substantially conventional system for receiving broadcast programming. Thus, FIG. 1 shows a television receiver 2, having a screen 4, and arranged to receive programming by way of an aerial 6. The television receiver 2 preferably comprises a tuner, not illustrated, and loudspeakers.

The television receiver 2 is connected to a set-top box 8 which incorporates an internal hard disc drive 10. Control of the set-top box 8 is by way of a remote control device 12. It will be appreciated that the set-top box 8 includes a processor (not shown). In a known manner, the set-top box is arranged to generate an electronic program guide for display on the screen 4. As is conventional, this electronic program guide lists programs being broadcast currently, or available in the future. A program can be selected for display on the screen 4 by way of the remote control unit 12. The viewer will highlight a selection in the electronic program guide and then presses a select button on the remote control unit 12. The set-top box 8 and the television receiver 2 are then controlled to select that program for presentation by way of the screen 4.

It is becoming common for a set-top box as 8 to incorporate a hard disc drive 10. The user may record the program currently being viewed on the internal hard disc. Alternatively, by way of the remote control unit 12, the user may control the set-top box 8 to record a program different from that being currently viewed onto the internal hard disc of the drive 10.

Although a hard disc, such as the internal hard disc 10 of the set-top box 8, can be given a large capacity, that capacity is, of course, finite.

Given the facility to record programs, a user is likely to record more and more content. It may be useful to record content which the viewer cannot watch as the program is broadcast, and the user may wish to retain recordings of favorite programs. With time and use, it is possible that the capacity of the internal hard disc of a set-top box 8 will be found to be inadequate.

The system shown in FIG. 1 provides external storage for receiving recorded content from the set-top box 8 to provide an increased storage capacity.

As shown in FIG. 1, a single external hard disc drive 14 may be connected to the set-top box 8. Additionally and/or alternatively, a series of hard disc drives 14 may be collectively connected to the set-top box 8 by way of a hub 16. The connection hub 16 may be provided by a USB or an Ethernet connection.

The present invention proposes that archiving of recordings from the internal disc in the hard disc drive 10 should occur automatically when certain predetermined criteria have been met. It is possible that the criteria are simply that anything recorded on the internal hard drive 10 should be moved if external storage is available. However, a viewer will generally find it more convenient if content which is likely to be required immediately is stored locally and content which is likely to be required, but not until a future time, is stored externally. It may also be more convenient for content which is accessed frequently to be stored internally and content which is only accessed on an infrequent basis to be stored externally. Accordingly, whilst the archiving process will occur automatically under the control of the processor in the set-top box 8, it is preferred that a user set the required criteria and one example of this process is illustrated in FIGS. 2a to 2d.

Figure 2A:
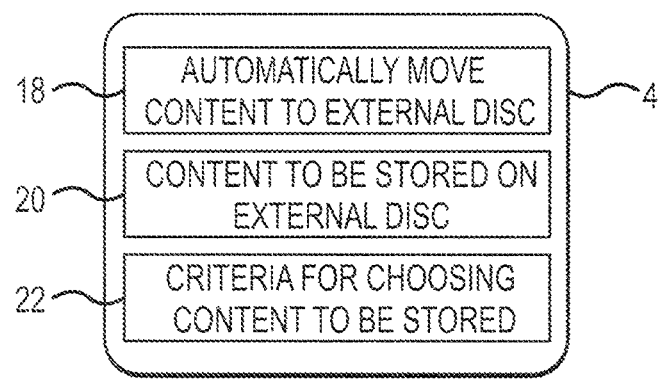
FIGS. 2a to 2d show a series of hierarchical on-screen menus enabling a user to set archiving criteria.

It is known for a user to control the operation of a set-top box, and hence of a television receiver, by use of the remote control unit 12 and on-screen menus. FIGS. 2a and 2d show a series of hierarchical on-screen menus for selecting archiving criteria. Initially, a user will display a "Settings" menu on the screen 4 by way of the remote control unit 12. An option "Archiving" is selected. This may provide a screen 4 as shown in FIG. 2a in which the further available "Archiving" choices available to the user are displayed. The first choice 18 is for the user to determine in what circumstances content is to be automatically moved to external storage such as the external hard disc drives 14. Selecting and highlighting this option 18 will provide on screen 4 the menu options of FIG. 2b. By these on-screen menus the viewer is given the options to turn off automatic archiving ("Never"), to have it happen when 75% of the internal disc capacity has been used, to have it happen when the content stored on the internal hard disc drive 10 is a number of months old, or to have it happen whenever content is recorded on the internal hard disc. The option to move content which is a specified number of months old may be varied from one to twelve months, for example.

Figure 2B:
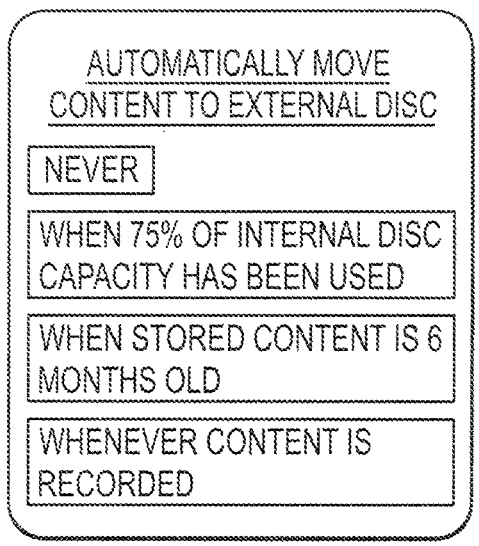
Figure 2C:
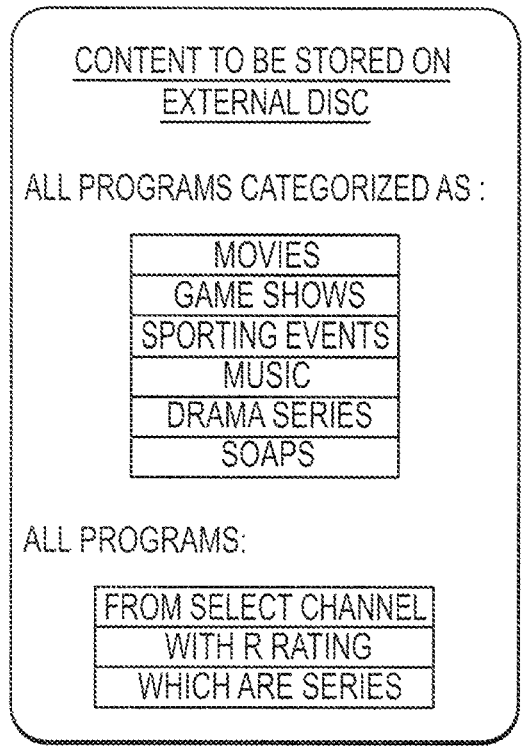
Figure 2D:
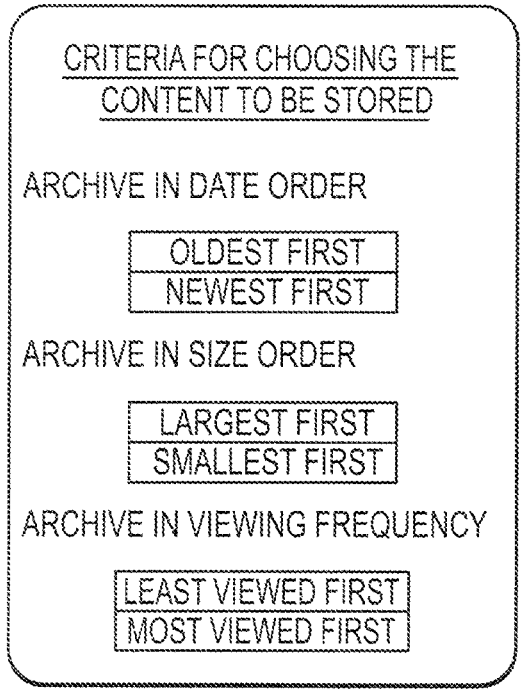

Once it has been determined by way of FIG. 2b in what circumstances automatic archiving is to happen, the user can move back to the screen of FIG. 2a. By then selecting the menu option 20 the user may determine what content is to be stored on the external discs 14. So, as shown in FIG. 2c, the user can choose to have all movies, or all sporting events, or other specified categories of programs, which have been recorded, transferred to the external discs 14. And/or the user can choose that all programs from a particular channel which have been recorded, or all programs with a particular rating be transferred to the external discs. The options on the on-screen menu of FIG. 2c also include the storing of all series on external discs 14.

Additionally and/or alternatively to the user selecting the type of content to be stored externally, the option 22 on the on-screen menu of FIG. 2a provides access to the menu screen of FIG. 2d which gives other options for choosing the content to be stored externally. Thus, and as shown in FIG. 2d, the date on which the program was broadcast can be used so that either the oldest or the newest recordings are archived first. Alternatively and/or additionally, the content may be archived in size order with either the largest or the smallest size programs archived first. Another alternative is to archive according to viewing frequency with either the least frequently viewed or the most frequently viewed programs archived first.

When there is a likelihood that the internal disc in the disc drive 10 will become full because of a viewer's recording habits, it is obviously advantageous to archive very large size content. This enables more capacity to be readily made available on the internal disc. A user may also find it convenient to archive content which is infrequently viewed so that frequently viewed content is kept locally.

Figure 3A:
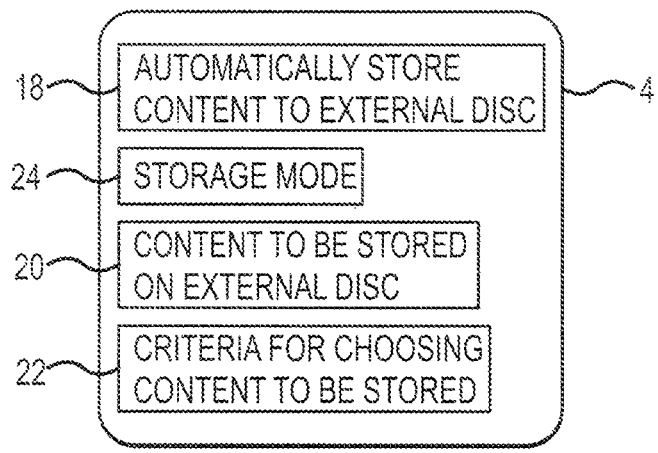
FIGS. 3a to 3e show a series of menus, similar to those of FIGS. 2a to 2d, to enable a user to select criteria for archiving, which menus additionally enable a selection to be made as to whether recorded content is to be copied or transferred.
Figure 3B:
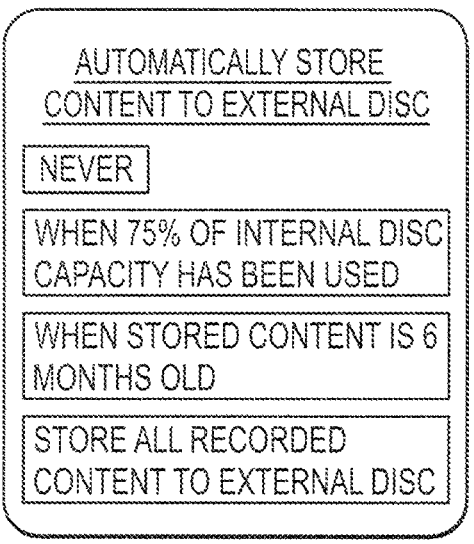
Figure 3C:
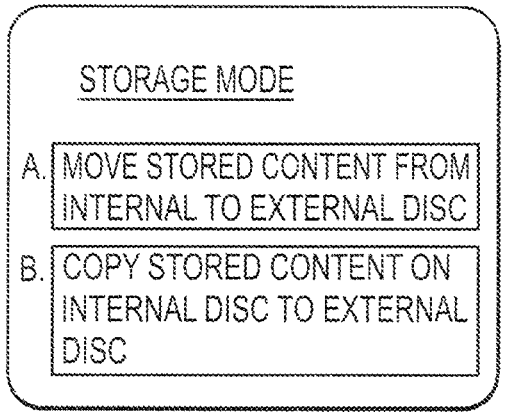

FIGS. 3a to 3e are very similar to FIGS. 2a to 2d and also show on-screen menus which can be accessed successively when a user sets the criteria for the content to be automatically archived. It will be seen that FIG. 3a shows the initial screen, comparable to that of FIG. 2a, and provides the choices 18, 20 and 22 also apparent in FIG. 2a. FIG. 3b is comparable to FIG. 2b. The options on the screen of FIG. 3b are substantially the same as those of FIG. 2b except that the option to "store whenever content is recorded" is changed to "store all recorded content". This would be of significance if, when content is being recorded, the set-top box was not connected to an external disc drive 14.

Figure 3D:
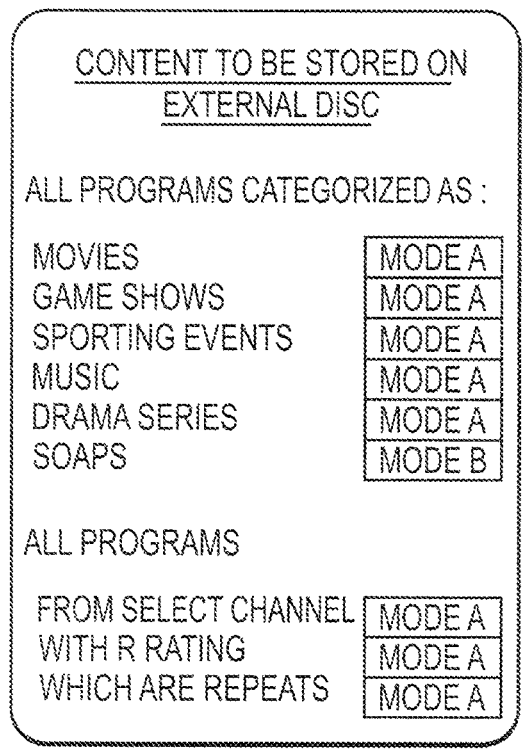
Figure 3E:
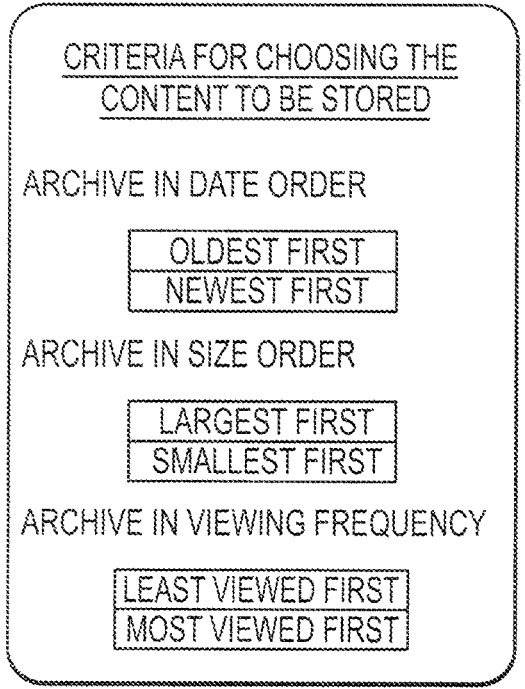

The menu option 22 of FIG. 3*a* leads to the on-screen menu of FIG. 3*e* which is the same as that of FIG. 2*d*.

It will be seen that the on-screen menu of FIG. 3*a* has an additional, fourth, option 24 for enabling a user to set the storage mode. Selecting this option 24 leads to screen FIG. 3*c*. The on-screen menu of FIG. 3*c* enables a user to determine whether all content to be archived is to be transferred from the internal disc to the external disc or whether it is to be copied. The copy option enables a user to backup content already stored by way of the internal disc drive 10.

Of course, if the content on the internal disc drive 10 is only backed up onto the external disc drives 14 there remains the potential for the internal disc 10 to become full. What is more, there will be little need to back up most of the stored content. Recorded movies, for example, are probably available to be purchased on DVDs in the event that the recorded movies become degraded or otherwise inaccessible on the internal disc. The menu options of the screen shown in FIG. 3*d* are similar to those of FIG. 2*c* in that they enable the viewer to determine what sort of programs are to be stored externally. However, the screen of FIG. 3*d* also enables the viewer to set the storage mode required. Thus, and for example as shown in FIG. 3*d*, if a viewer finds recordings of soaps valuable, the viewer may arrange for recorded soaps to be backed up so that there is a recording both on the internal disc and on an external disc. This is indicated by setting the storage mode to B. All other recorded programs are transferred to the external discs.

The set-top box 8, having been provided with the user's criteria for archiving, as shown in FIGS. 2 and 3, will automatically transfer recorded content from the internal hard disc 10 to the external hard discs 14 as described further below with reference to FIG. 5. Whilst undertaking the transfer, the system collates and stores information identifying the transferred broadcast programs and their locations in the external storage. The details of the transferred programs, the individual external discs on which they had been stored, and their location on those discs are recorded by the internal hard drive 10.

When a viewer wishes to access programming stored externally, the set-top box 8 is controlled, by way of a remote control unit 12, to provide an on-screen guide of the available archived material. An extract from such a guide is shown in FIG. 4. In FIG. 4 the programs are given in the order of the date on which they were recorded. The program's title is provided as well as the channel from which each program was recorded. It will be seen that by using the remote control unit, a user can scroll to programs recorded earlier or later than those shown.

In a manner akin to that used for the retrieval of programs already stored in the set-top box 8, retrieval of the archived material is achieved by highlighting by way of the remote control 12 one of the programs displayed in the guide of FIG. 4. Then the user presses the select button on the remote control to view the selected program.

As shown in FIG. 4, the available archived material may be presented to the viewer in alternative fashions. For example, all of the archived movies might be listed either in alphabetical order or in date of recording order. Similarly other categories of archived materials such as sporting events, drama series and soaps may be displayed on screen for selection. As indicated in FIG. 4, each category of program will be associated with one of the colored buttons on the remote control so that selection of programs in that category can be achieved by selecting the appropriately colored button.

Figure 5:
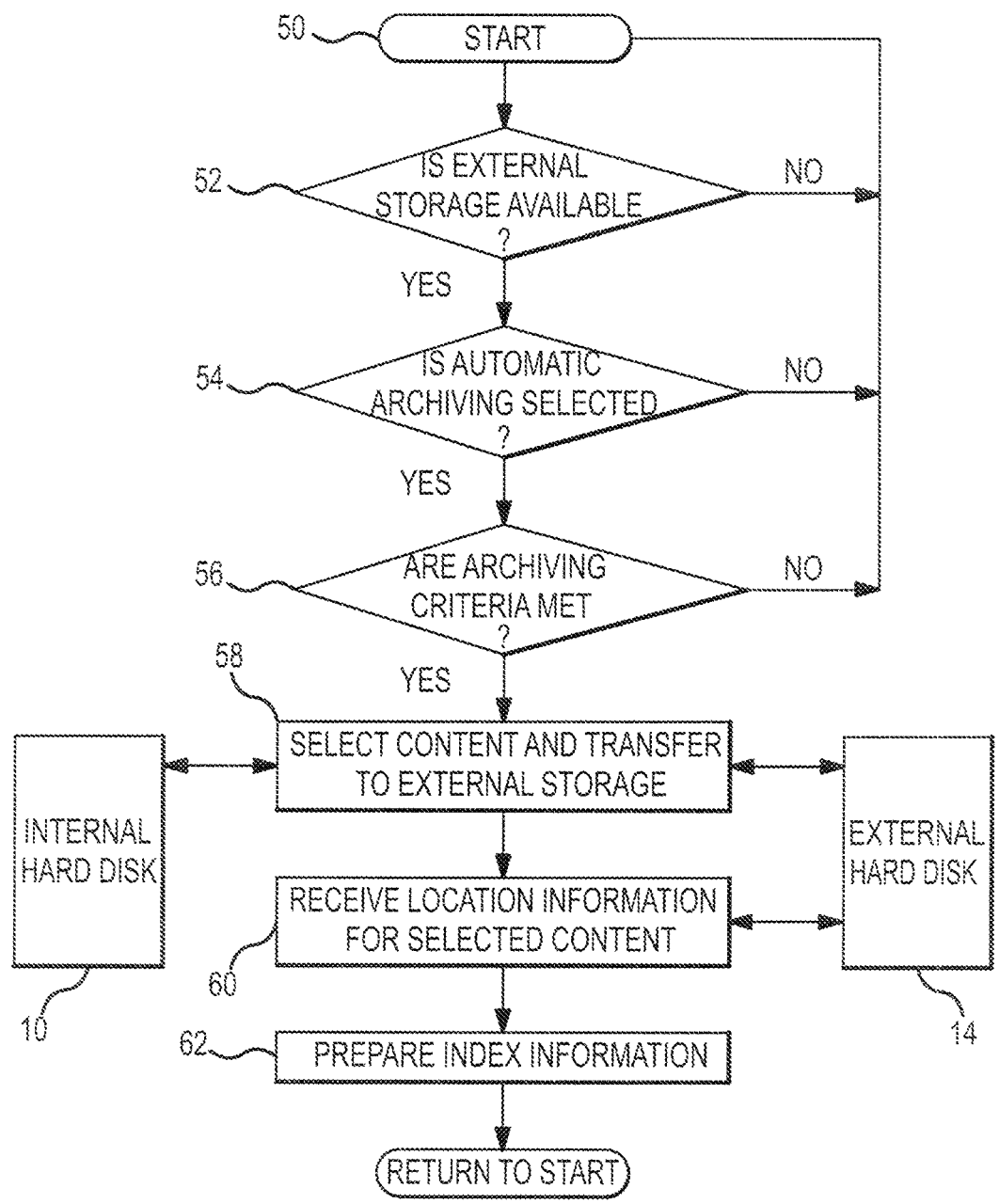
FIG. 5 illustrates one possible routine for archiving broadcast programs for subsequent retrieval.

FIG. 5 illustrates a routine for archiving content stored on the internal hard disc 10 of a set-top box 8. The routine will generally be initiated at 50 when a set-top box is either switched on or switched from standby. The first decision in the routine at 52 is for the set-top box to determine if external storage, such as hard disc drives 14, is available. If there is no such storage the routine returns to the start. If there is external storage, the routine moves to decision 54 to determine if automatic archiving has been selected. The answer to this decision is yes if an option other than "Never" has been selected at screens FIG. 2*b* or FIG. 3*b*, for example.

Assuming that automatic archiving has been selected, the routine moves to decision 56 at which it has to determine if the archiving criteria have been met. So, for example, if the viewer has determined that automatic archiving is to be undertaken when 75% of the internal disc capacity has been used, the routine must determine how much of the internal disc capacity has been used. If there is less than 25% capacity available, then the routine continues. Similarly, the routine will continue if the set-top box is storing locally content more than six months old, and that option has been selected.

If it is determined at 56 that auto archiving is to take place, it is then necessary for the set-top box 8, to determine and select content for transfer from the internal hard disc 10 to the external hard disc 14. For example, if the viewer has asked that all movies be archived, the set-top box, at step 58, will identify all stored movies on the internal hard disc and transfer that content to one or more external hard discs 14. At step 60 the set-top box receives information as to the location of the stored movies. This location information will incorporate the address of the stored content on a disc 14 but may also identify which one of several discs 14 is concerned. At step 62 the location information is stored together with information identifying the content. This index will provide, when required, the on-screen catalogue as shown in FIG. 4. The information identifying the programs, viewable by a user, will mask the location information required by the set-top box.

Having completed the index, the routine of FIG. 5 may return to the start.

The user selectable criteria may also enable a user, for example, to designate that certain ones of the external hard discs to be used, are named, for example, to represent the categories of programs to be stored on each disc. For example, there may be a hard disc for "movies", and a separate one for "sports", and so on. When more than one hard disc is provided, each category of program can be assigned its own disc and its own automatic archiving criteria.

It will be appreciated that modifications of and variations in the embodiments as described and illustrated may be made within the scope of the appended claims.

The invention claimed is:

1. A method of archiving broadcast programs which have been received at a set-top box and recorded at storage local to the set-top box as they are received, the method comprising:

recording, by the set-top box, one or more of the broadcast programs with a recorder of the set-top box;

applying, by the set-top box, predetermined criteria to determine whether to retain one or more recordings of the one or more of the broadcast programs or to transfer the one or more recordings to an identified device of a set of one or more devices external to the set-top box and communicatively coupled to the set-top box via a hub that is communicatively coupled to the set-top box via a network interface of the set-top box;

consequent to determining that the one or more recordings are to be transferred to the identified device based on the predetermined criteria, automatically transferring, without additional user input or interaction, the one or more recordings to the identified device to facilitate saving the one or more recording on a hard drive of the identified device, wherein:

the predetermined criteria specifies a threshold value of available storage capacity, and the determining comprising determining that a local available storage capacity of local storage of the set-top box is below the threshold value;

the predetermined criteria further specifies a particular broadcast program located on the local storage that is to be maintained on the local storage and not transferred to the set of one or more devices despite satisfying other predetermined criteria; and the automatically transferring comprises causing, by the set-top box, storing of the one or more recordings of the one or more of the broadcast programs at selected locations of the identified device;

storing and maintaining, by the set-top box, identifying information at the local storage of the set-top box for each transferred broadcast program stored at the identified device; and accessing, by the set-top box, the identifying information at the local storage of the set-top box to produce an on-screen guide of available automatically transferred broadcast programs in identified device.

2. The method of archiving broadcast programs according to claim 1, wherein the predetermined criteria includes one or more of:

an age of recorded programs, a size of recorded programs, a frequency with which recorded programs are accessed, and/or user settings.

3. The method of archiving broadcast programs according to claim 1, further comprising receiving a selection at the set-top box via a produced on-screen menu for presentation of the one or more recordings stored at the identified device.

4. The method of archiving broadcast programs according to claim 1, wherein the set of one or more devices comprises a plurality of devices, and the method further comprises creating additional recordings of at least some of the broadcast programs, and automatically transferring the additional recordings to selected devices of the plurality of device based on the predetermined criteria.

5. The method of archiving broadcast programs according to claim 4, wherein the identifying information comprises an identifier of the identified device among the plurality of devices on which each recording of the one or more recordings is stored.

6. The method of archiving broadcast programs according to claim 4, wherein the hub is physically separate from the set of one or more devices and the set-top box.

7. The method of archiving broadcast programs according to claim 1, wherein the predetermined criteria comprise an instruction for a particular broadcast program to be maintained on the storage local to the set-top box and archived to the identified device.

8. The method of archiving broadcast programs according to claim 1, further comprising:

receiving an instruction at the set-top box to present the predetermined criteria; and cause presenting for display, by the set-top box, a menu identifying criteria for determining how or when content should be transferred to the set of one or more devices.

9. The method of archiving broadcast programs according to claim 8, further comprising:

causing presenting of a sub-menu identifying selectable options of categories of broadcast content to be stored on the set of one or more devices.

10. The method of archiving broadcast programs according to claim 9, wherein the sub-menu further comprises selectable options of broadcast programs to be stored on the set of one or more devices corresponding to all programs from a select channel.

11. The method of archiving broadcast programs according to claim 8, further comprising:

causing presenting of selectable options for identifying content to be stored on the set of one or more devices, the selectable options comprising an option to transfer recordings in a first order based on recording dates.

12. The method of archiving broadcast programs according to claim 11, further comprising:

causing presenting of selectable options for identifying content to be stored on the set of one or more devices, the selectable options comprising an option to transfer recordings in a second order based on recording size.

13. The method of archiving broadcast programs according to claim 12, further comprising:

causing presenting of selectable options for identifying content to be stored on the set of one or more devices, the selectable options comprising an option to transfer recordings in a second order based on viewing frequency.

14. A system for receiving and presenting broadcast programs, the system comprising:

a set-top box arranged to receive and process the broadcast programs and to cause a selected processed broadcast program to be presented by a presentation device communicatively coupled to the set-top box, the set-top box comprising storage local to the set-top box arranged to store recordings of selected received broadcast programs;

a hub that is communicatively coupled to the set-top box via a network interface of the set-top box and that is communicatively coupled to a set of one or more devices that are external to the set-top box and that comprise one or more, hard drives;

wherein the set-top box is arranged to:

record one or more of the broadcast programs with a recorder of the set-top box;

apply predetermined criteria to determine whether to retain one or more recordings of the one or more of the broadcast programs or to transfer the one or more recordings to an identified device of the set of one or more devices;

consequent to determining that the one or more recordings are to be transferred to the identified device based on the predetermined criteria, automatically transfer, without additional user input, the one or more recordings to the identified device to facilitate saving the one or more recording on a hard drive of the identified device, wherein:

the predetermined criteria specifies a threshold value of available storage capacity, and the determining comprising determining that a local available storage capacity of the storage local to the set-top box is below the threshold value;

the predetermined criteria further specifies the identified device as a first storage location of a first category of broadcast programs, and specifies a second identified device as a second storage location of a second category of broadcast programs, and wherein one of both of the first category and the second category corresponds to at least one of movies, sporting events, and/or individual broadcast series programs; and wherein the set-top box is arranged to store and maintain identifying information for each recording of the one or more recordings transferred to and stored at the identified device as long as the recording is maintained at the identified device, and wherein the presentation device comprises a display, and wherein the set-top box is arranged to generate and show on the display a list of the one or more recordings transferred to provide an on-screen guide of available material comprising the one or more recordings.

15. The system for receiving and presenting broadcast programs according to claim 14, further comprising a user interface for enabling a user to select one of the one or more recordings maintained at the identified device for presentation, wherein to select for presentation one of the one or more recordings, one program in the displayed list is selected by way of the user interface resulting in access to the identified device to transfer the selected program back to the set-top box for presentation.

16. The system for receiving and presenting broadcast programs according to claim 15, wherein said user interface additionally enables the user to select at least one of the broadcast programs for presentation or for recording.

17. The system for receiving and presenting broadcast programs according to claim 16, wherein said user interface is a remote control unit.

18. The system for receiving and presenting broadcast programs according to claim 14, further comprising a user interface for enabling a user to select at least one of the broadcast programs for presentation or for recording.

19. The system for receiving and presenting broadcast programs according to claim 14, wherein:

the presentation device at the set-top box further comprises at least one loudspeaker; and the set-top box comprises a tuner, a processor, and at least one hard disc providing local storage.

* * * * *